2,982,612

PROCESS FOR PRODUCING SODIUM ZEOLITE A

Richard M. Barrer, Bromley, and Frederick W. Bultitude, Harwell, Didcot, Berkshire, England, assignors to Union Carbide Corporation, a corporation of New York No Drawing. Filed Jan. 26, 1959, Ser. No. 788,733

5 Claims. (Cl. 23—113)

This invention relates to a process for preparing sodium zeolite A. More particularly, the invention relates to a process for producing substantially pure sodium zeolite A from reactant mixtures having a relatively high silica-alumina ratio.

Sodium zeolite A is a synthetic crystalline zeolitic molecular sieve which may be represented by the formula:

$$1.0 \pm 0.2 Na_2O : Al_2O_3 : 1.85 \pm 0.5 SiO_2 : YH_2O$$

wherein Y may have any value from essentially zero up to about 5.0. Sodium zeolite A has an X-ray powder diffraction pattern characterized by at least those reflections set forth in Table I below.

TABLE I d values of reflection in A.

12.2±0.2
8.6±0.15
7.02±0.15
5.45±0.10
4.06±0.05
3.68±0.05
3.38±0.05
3.26±0.05
2.96±0.05
2.73±0.05
2.61±0.05

Sodium zeolite A, its properties, and a process for its preparation are described in detail in United States Patent No. 2,882,243 issued April 14, 1959.

According to this known process, sodium zeolite A may be prepared only from a hydrous sodium aluminosilicate reactant mixture wherein the $SiO_2:Al_2O_3$ ratio is less than about 3.5. (The $SiO_2:Al_2O_3$ ratio is a convenient way of expressing the available silicon and aluminum in the reactant mixture.) Substantially pure sodium zeolite A may be prepared by the process of United States Patent No. 2,882,243 issued April 14, 1959 from reactant mixtures whose compositions, expressed as mixtures of oxides, fall within either of the following ranges of oxide mole ratios:

|  | Range 1 | Range 2 |
|---|---|---|
| $SiO_2/Al_2O_3$ | 0.5–1.3 | 1.3–2.5 |
| $Na_2O/SiO_2$ | 1.0–3.0 | 0.8–3.0 |
| $H_2O/Na_2O$ | 35–200 | 35–200 |

For reactant mixtures wherein the $SiO_2:Al_2O_3$ ratio is between about 2.5 and 3.5, the process of United States Patent No. 2,882,243 issued April 14, 1959 produces sodium zeolite A which is contaminated with other zeolitic species.

It is an object of this invention to provide a process for producing sodium zeolite A from reactant mixtures wherein the $SiO_2:Al_2O_3$ ratio has a value from about 4 to about 6.

It is a further object of this invention to provide a method for producing substantially pure sodium zeolite A from such reactant mixtures.

Other objects of the invention will be apparent from the following description and the appended claims.

According to the process of this invention sodium zeolite A is produced by crystallization from hydrous sodium aluminosilicate reactant mixtures wherein the $SiO_2:Al_2O_3$ ratio has a value from about 4 to about 6 at temperatures from about 60° C. to about 110° C. By careful control of the crystallization time, substantially pure sodium zeolite A may be obtained.

The range of reactant mixture compositions useful in the process of this invention, expressed in terms of oxide mole ratios, is about as follows:

$Na_2O/SiO_2 = 0.3–1.0$
$SiO_2/Al_2O_3 = 4–6$
$H_2O/Na_2O = 130–300$

The reactant mixtures may be conveniently prepared by combining a silica sol with an aqueous solution of sodium aluminate and then adding the resulting gel to aqueous sodium hydroxide. However, sources of alumina such as aluminum oxide or aluminum hydroxide may be used in place of sodium aluminate and other silica sources such as solid silica or sodium silicate may be used in place of a silica sol. Also, the order of addition of reagents in preparing the reaction mixture may be varied without affecting the yield or purity of the zeolite A product.

Next, the reactant mixture is heated and maintained at a temperature between about 60° C. and 100° C. until sodium zeolite A has crystallized. After crystallization, the solids may be separated from the liquor by filtration and the crystals washed and dried according to standard procedures.

The crystallization time is critical in the process of this invention, particularly at temperatures above about 100° C. Crystallization time must be long enough to yield sodium zeolite A from the reaction mixture, but short enough to prevent formation of other crystalline materials.

At about 60° C., the reaction mixture should be maintained at temperature for at least 48 hours to crystallize zeolite A. After about 5 days, contaminating crystalline species are formed in the reaction mixture.

At about 90° C., zeolite A crystallizes from the reaction mixture after about 24 hours and contaminating crystalline species again appear after about 5 days at crystallization temperature.

At about 110° C., zeolite A crystallizes after about 1 hour and substantially quantitative yields of zeolite A are obtained after about 2 to 3 hours at temperature. Contaminating crystalline species appear after about 5 hours at 110° C., and after 24 hours at this temperature all the zeolite A originally formed is converted into other crystalline materials. The optimum yields of sodium zeolite A are thus obtained by maintaining one of the operable reaction mixtures of this invention at about 110° C. for about 2 to 3 hours.

Therefore, the crystallization time required in the process of this invention decreases as the crystallization temperature increases and the crystallization time varies over a range of from about 48 hours to 5 days at 60° C. to about 1 hour to 5 hours at 110° C.

The following examples illustrate the process of the present invention.

Example 1

A reaction mixture having the composition $$Na_2O.Al_2O_3.4SiO_2$$

was prepared as follows: sodium aluminate (containing 87 wt.-percent $NaAlO_2$, a trace of iron and the remainder free caustic soda) was dissolved in water. The ferric hydroxide which precipitated was filtered off, and a silica sol (containing 30 wt.-percent $SiO_2$) was added. During the addition of the silica sol a gel was formed. In order to attain homogeneity, the mixture was stirred for about one-half hour after the addition.

One-half gram (dry basis) portions of this gel were added to sodium hydroxide solutions to give several 10 milliliter portions of the final reaction mixture with about the composition:

$$Na_2O/SiO_2=0.5$$
$$SiO_2/Al_2O_3=4$$
$$H_2O/Na_2O=246$$

These mixtures were placed in sealed Pyrex tubes of approximately 20 milliliter volume. The sealed tubes were placed in an oven and heated at 110° C. for from about 2 hours to 1 day. The glass tubes were cooled, the products filtered, washed with hot water until free of alkali, and air-dried. The products from tubes heated for less than about 5 hours were identified as sodium zeolite A by X-ray analysis and chemical analysis. The composition from chemical analysis was: 16.3 wt-percent $Na_2O$, 28.0 wt.-percent $Al_2O_3$, 33.5 wt.-percent $SiO_2$ and 22.1 wt.-percent $H_2O$ giving the stoichiometric formula: $Na_2O.Al_2O_3.2.0SiO_2.4.6H_2O$. The zeolite A crystals were approximately 3 micron cubes, isotropic, with a refractive index of 1.472.

The samples heated for one day contained substantially no zeolite A. The zeolite A originally formed had been converted to other crystalline species by the prolonged heating at 110° C.

*Example II*

A reaction mixture having the composition $$Na_2O.Al_2O_3.6SiO_2$$

was prepared as follows: sodium aluminate (containing 87 wt.-percent $NaAlO_2$, a trace of iron and the remaining free caustic soda) was dissolved in water, the ferric hydroxide which precipitated was filtered off, and a silica sol (containing 30 wt.-percent $SiO_2$) was added. During the addition of the silica sol a gel was formed. In order to attain homogeneity, the mixture was stirred for about one-half hour after the addition.

1.0 gram (dry basis) portion of this gel was added to a sodium hydroxide solution to give 14 milliliters of final reaction mixture with about the composition:

$$Na_2O/SiO_2=0.67$$
$$SiO_2/Al_2O_3=6$$
$$H_2O/Na_2O=133$$

This mixture was placed in a sealed Pyrex tube of approximately 20 milliliter volume. The sealed tube was placed in an oven and the temperature was raised to 89° C. and maintained for 2 days. The glass tube was cooled, the product filtered, washed with hot water until free of alkali and air-dried. The product was identified as sodium zeolite A by X-ray analysis and chemical analysis. The chemical analysis and physical properties of the zeolite A were the same as in Example I.

What is claimed is:
1. A process for producing substantially pure sodium zeolite A which comprises: (1) preparing a reactant mixture having the composition expressed in terms of oxide mole ratios about as follows:

$$Na_2O/SiO_2=0.3-1.0$$
$$SiO_2/Al_2O_3=4.6$$
$$H_2O/Na_2O=130-300$$

and (2) maintaining said reactant mixture at a temperature between about 60° C. and 110° C. until sodium zeolite A crystallizes.

2. A process for producing substantially pure sodium zeolite A which comprises: (1) preparing a reactant mixture having the composition expressed in terms of oxide mole ratios about as follows:

$$Na_2O/SiO_2=0.3-1.0$$
$$SiO_2/Al_2O_3=4-6$$
$$H_2O/Na_2O=130-300$$

and (2) maintaining said reactant mixture at a temperature between about 60° C. and 110° C. for a time varying from about 48 hours to 5 days at 60° C. to about 1 hour to 5 hours at 110° C. to crystallize sodium zeolite A.

3. A process for producing substantially pure sodium zeolite A which comprises: (1) preparing a reactant mixture having the composition expressed in terms of oxide mole ratios about as follows:

$$Na_2O/SiO_2=0.3-1.0$$
$$SiO_2/Al_2O_3=4-6$$
$$H_2O/Na_2O=130-300$$

and (2) maintaining said reaction mixture at about 110° C. for about 2 to 3 hours to crystallize sodium zeolite A.

4. Process for producing substantially pure sodium zeolite A which comprises (1) preparing a reactant mixture having the composition expressed in terms of oxide mole ratios as follows:

$$Na_2O/SiO_2=0.5$$
$$SiO_2/Al_2O_3=4$$
$$H_2O/Na_2O=246$$

and (2) maintaining said reactant mixture at about 110° C. for between about 2 hours and 5 hours to crystallize sodium zeolite A.

5. Process for producing substantially pure sodium zeolite A which comprises: (1) preparing a reactant mixture having the composition expressed in terms of oxide mole ratios as follows:

$$Na_2O/SiO_2=0.67$$
$$SiO_2/Al_2O_3=6$$
$$H_2O/Na_2O=133$$

and (2) maintaining said reactant mixture at about 89° C. for about 2 days to crystallize sodium zeolite A.

References Cited in the file of this patent
UNITED STATES PATENTS
2,882,243    Milton _____ Apr. 14, 1959

UNITED STATES PATENT OFFICE
CERTIFICATE OF CORRECTION

Patent No. 2,982,612                                         May 2, 1961

Richard M. Barrer et al.

It is hereby certified that error appears in the above numbered patent requiring correction and that the said Letters Patent should read as corrected below.

Column 4, line 7, for "$SiO_2/Al_2O_3=4.6$" read -- $SiO_2/Al_2O_3=4-6$ --.

Signed and sealed this 14th day of November 1961.

(SEAL)
Attest:

ERNEST W. SWIDER                                    DAVID L. LADD
Attesting Officer                                      Commissioner of Patents
                                                                                           USCOMM-DC